United States Patent [19]

Robinet

[11] Patent Number: 4,938,077

[45] Date of Patent: Jul. 3, 1990

[54] DEVICE TO MEASURE A LARGE RANGE OF FLUID FLOW

[75] Inventor: Alain Robinet, Toulouse, France

[73] Assignee: Societe Nationale Elf Aouitaine (Production), Courbevoie, France

[21] Appl. No.: 216,376

[22] Filed: Jul. 8, 1988

[30] Foreign Application Priority Data

Jul. 9, 1987 [FR] France ............... 87 09757

[51] Int. Cl.$^5$ ............... G01F 1/22; G01F 1/42
[52] U.S. Cl. ............................... 73/861.62
[58] Field of Search ............ 73/861.53, 861.61, 861.62

[56] References Cited

U.S. PATENT DOCUMENTS

| | | | |
|---|---|---|---|
| 1,924,125 | 8/1933 | Linderman, Jr. | 73/861.62 |
| 2,402,585 | 6/1946 | Allison | 73/861.53 |
| 3,026,727 | 3/1962 | Spurling | 73/861.62 |
| 4,231,253 | 11/1980 | Ohnhaus et al. | 73/861.62 |

Primary Examiner—Herbert Goldstein
Attorney, Agent, or Firm—Oblon, Spivak, McClelland, Maier & Neustadt

[57] ABSTRACT

Improvement for measuring fluid flow with an orifice meter. The device to measure flow in a conduit includes an orifice of variable section defined by two moveable plates in contact with each other, and which can be positioned with the orifice coaxial with the conduit. The plates are movable by equal translations in opposite directions. Each plate has an opening, and edges of the repective openings which face each other have a cutout in the shape of a right angle isosceles triangle. The bisector of the right angle cutout of each plate is parallel to the direction of translation of the plates and intersects the axis of the conduit. The device permits treating with the same precision, the measurement of flow having variations of a large range.

8 Claims, 1 Drawing Sheet

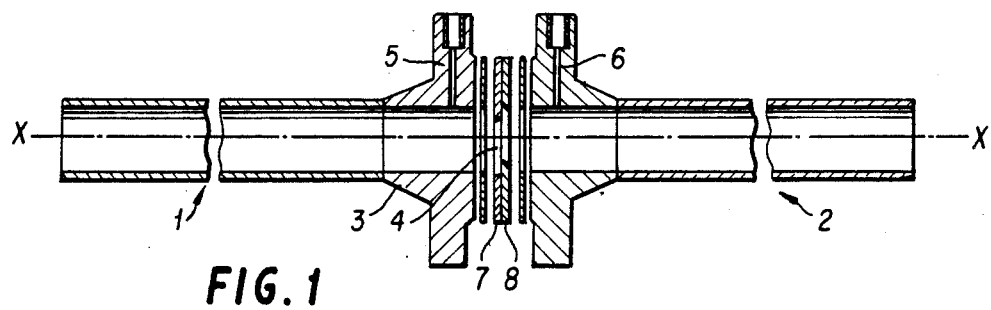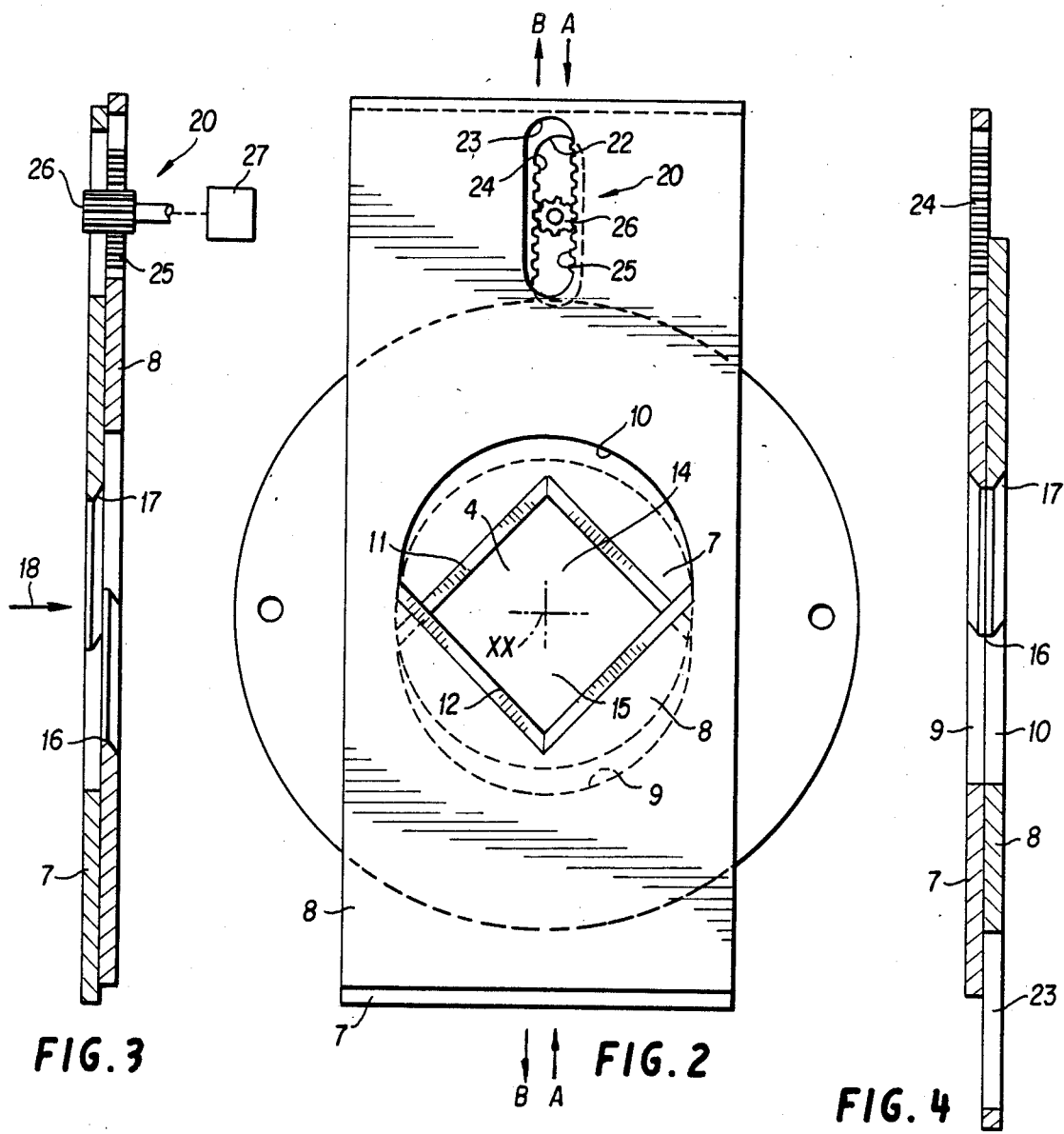

DEVICE TO MEASURE A LARGE RANGE OF FLUID FLOW

The present invention relates to a device to measure the flow of fluid, liquid or gaseous, by means of an orifice flowmeter providing very low variation of precision for a large range of flow values.

BACKGROUND OF THE INVENTION

One knows and uses various devices by means of which orifices of different diameter or size are positioned successively to traverse a conduit, each orifice permitting the measure of flow with sufficient precision in a range or interval of flow whose median corresponds to the optimal precision.

Since the intervals of measure are arranged in a continuous series, one obtains a range of values of flow which can be large but is of fluctuating precision, optimal for the median value of flow of each orifice, but reduced at the limits. In all of these arrangements, the passage or change from one interval to the next is discontinuous since it is necessary to change the plate of the orifice.

Thus, U.S. Pat. Nos. 1,903,068 filed Mar. 4, 1931 and 1,965,826 filed May 6, 1931 describe devices comprising a chamber permitting the removal of an orifice plate with one size opening and replacement with another having an orifice opening of a different size.

Automation of the substitution of one orifice for another of different size has been attained either by translation of a single plate having plural orifices of different sizes, as in U.S. Pat. No. 3,105,384 filed Jan. 23, 1961, or by rotation of a plate having plural orifices whose centers are on a common circle, as in U.S. Pat. No. 3,079,796 filed Feb. 4, 1960.

These devices necessarily have a large chamber whose seals are the object of frequent inspection and which make use difficult remote from the centers of production sites, particularly on sub marine soil and also where very high pressures must be handled.

SUMMARY OF THE INVENTION

The object of the present invention is to overcome these difficulties of the prior devices.

An orifice flowmeter of variable size or section can be realized with mechanical means without encumbrances like those which must be contained in a chamber with a controlled seal.

An orifice of circular variable section, such as those used in the photography field can be used, and permits the use of the same already available calibration curves. However the mechanisms may be too fragile to be used in corrosive fluids and those which contain abrasive particles.

Among the other configurations of openings, the square permits conserving a constant geometric definition which enables comparing and correlating the curves of calibration which have been established for circular orifices of corresponding section.

A device to measure the flow of gaseous or liquid fluid, according to the invention, comprises means for measuring the difference in pressure in the conduit on one side and the other of an orifice coaxial with the conduit, and is characterized by the fact that the orifice is provided with means for varying the cross-section area of the orifice while conserving the same geometric definition or configuration.

According to a preferred embodiment, the means for varying the section of the orifice while conserving the geometric definition are constituted by two plane plates, superimposed and sliding one on the other, moveable by translations of equal amplitudes and in opposite directions, each with an opening having facing edges which overlap and each have a right angle isosceles triangle cut-out, the bisector of the right angle of which is parallel to the direction of translation of the plates, and intersects the axis of the conduit.

One preferred embodiment of the invention, which is hereinafter described in detail with reference to the drawings, is given as a non-limiting example of the invention.

BRIEF DESCRIPTION OF THE DRAWINGS

FIG. 1 is a schematic view in longitudinal section of an installation according to the invention:

FIG. 2 is an enlarged front view showing the position of the plates in the conduit, and face of the square orifice of variable section defined by the plates;

FIG. 3 is a view in section showing the plates constituting the device of FIG. 2; and FIG. 4 is a view in section showing the same plates positioned for machining.

DETAILED DESCRIPTION

With reference to FIG. 1 there is shown, interposed between two conduit sections 1 and 2 having an axis X—X, a flow measuring device in the form of an orifice meter or gage 3 comprising an orifice 4, between two means 5 and 6 to measure the pressure in the conduit upstream and downstream of the orifice. Such an arrangement with a single plate defining the orifice is well known in the prior art.

In accordance with the invention, the orifice 4 is defined by two plates 7 and 8 perpendicular to the axis X—X of the conduit and movable relative to each other.

FIG. 2 shows how the two plates 7 and 8 define the square orifice 4.

The plates 7 and 8 have respective openings 9 and 10, and comprise on the respective edges which face each other and overlap, respective cut-outs 11 and 12 in the form of a right angle isosceles triangle such that the bisectors 14 and 15 of the opposed right angles are superimposed on a projection of the face as shown at FIG. 2, and intersect the axis X—X of the conduit. The remaining portions of the openings 9 and 10 can have an arcuate generally semi-circular contour, as shown at FIG. 2.

The two plates are moveable by translations of equal amplitudes and in opposite directions, toward each other in the direction of arrows A, A, and away from each other in the direction of the arrows B, B. The bisectors 14 and 15 of the opposed right angles are parallel to the straight line directions of translation of the plates shown by the arrows A, A, and B, B. For most measurements, the center of area of the orifice is essentially at the center of the conduit, at the axis X—X.

FIGS. 2 and 3 show a means 20 which can be used to simultaneously move the plates in opposite directions to adjust the size of the orifice. Slots 22 and 23 are formed in the respective plates 7 and 8, and one side edge of each slot is machined, for example by broaching to provide rack type gear teeth 24 and 25. These teeth extend parallel to the direction of movement of the plates, and the teeth 24 on plate 7 face toward the teeth 25 on plate 8. A gear 26 extends through the slots 22, 23, and meshes with the rack teeth 24 and 25. The gear 26 is rotatable about a fixed axis so that plate 7 is lowered and plate 8 is lifted to decrease the size of the square orifice when the gear is rotated anti-clockwise (as viewed at FIG. 2), and the size of the orifice is increased when the gear is rotated clockwise. The gear 26 can be rotated by any suitable means such as a hand crank, or for remote operation, with a stepping motor 27 which can be electrically or hydraulically powered.

The use of plates each with a through opening like the openings 9 and 10, balances any fluid pressure forces acting in the planes of the plates, and adapts the orifice for use with high pressure fluids. It will be noted that the regular polygon i.e. square configuration of the orifice remains the same as the plates are moved to change the size of the orifice, and thus the geometrical configuration of the orifice is conserved while its area is changed.

As is customary for gas, the edges of the cut-outs 11 and 12 are machined to a sharp edge angle 16 of 90 degrees at the fluid entrance or upstream side, and have a truncation or bevel 17 at an angle of 45 degrees at the exit or downstream side. This particular machining is shown at FIG. 3 where the plates are show in section, and in the assembly of FIG. 2. The direction of fluid arrival is show by the arrow 18 in FIG. 3.

As is customary, the upstream face of each plate 7, 8, which faces toward the arriving liquid or gaseous fluid, has been subjected to a particular elaborate surface treatment to provide this face with a polished smooth surface.

FIG. 4 shows the two plates positioned for machining the periphery of the orifice, the sharp edge angle 16, and the bevel 17 of 45 degrees. To attain this position, one of the plates is turned over, and is then rotated 180 degrees so the smooth polished faces of the plates are then in contact with each other which has the advantage of giving an improved definition to the machining of these edges. The plates are clamped together during such machining. As is evident from FIG. 4, the openings 9 and 10 are identical, and the cutouts 11 and 12 are identical.

While a preferred embodiment has been shown and described, variations and changes can be made without departing from the scope of the invention.

I claim:

1. In an apparatus for measuring the flow of fluid in a conduit and comprised of an orifice and means for measuring the pressure upstream and downstream of the orifice, the improvement comprising, a first flat plate in face to face relation to a second flat plate, said plates having overlapping adjacent edges defining an orifice in the shape of a regular polygon, said orifice having its center of area substantially at the axis of the conduit, said first and second plates each being movable in a straight line to vary the area of the orifice while conserving said regular polygon shape of the orifice.

2. The improvement of claim 1 wherein, said orifice has the shape of a square.

3. The improvement of claim 2 wherein said orifice is defined by adjacent edges of first and second flat plates which are superimposed for sliding movement relative to each other, said plates each having an edge with a cut-out in the shape of a right angle isosceles triangle, the edges of said cut-outs overlapping and facing each other, said plates being moveable in equal and opposite directions relative to the axis of the conduit, and the bisectors of each of said right angles intersecting the axis of the conduit.

4. The improvement of claim 3 wherein the edge of each plate in which the triangle cut-out is formed is an edge of an opening in the plate.

5. The improvement of claim 1 wherein, said first and second plates are each movable in opposite directions along the same straight line to vary the area of the orifice while maintaining the center of area of the orifice substantially at the axis of the conduit.

6. In an apparatus for measuring the flow of fluid in a conduit and comprised of an orifice and means for measuring the pressure upstream and downstream of the orifice, the improvement comprising, means for measuring a large range of fluid flow through said conduit, said means comprising, a first flat plate in face to face relation to a second flat plate, said plates having overlapping adjacent edges defining an orifice in the shape of a regular polygon, said orifice having its center of area at a predetermined position with respect to the axis of the conduit, said first and second plates each being movable in a straight line to vary the area of the orifice while conserving said regular polygon shape of the orifice.

7. The improvement of claim 6 wherein, said first and second plates are each movable in opposite directions along the same straight line to vary the area of the orifice while maintaining the center of area of the orifice substantially at said predetermined position.

8. The improvement of claim 7 further comprising, motor means for moving the plates in opposite directions.

* * * * *